United States Patent
Ismail

(10) Patent No.: US 8,060,123 B2
(45) Date of Patent: Nov. 15, 2011

(54) SYSTEM AND METHOD FOR USING SMS AND TAGGED MESSAGE TO SEND POSITION AND TRAVEL INFORMATION TO SERVER AND/OR TO PEERS

(75) Inventor: Samir Ismail, Dublin, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 743 days.

(21) Appl. No.: 11/725,851

(22) Filed: Mar. 19, 2007

(65) Prior Publication Data

US 2008/0233981 A1 Sep. 25, 2008

(51) Int. Cl.
*H04W 4/00* (2009.01)
(52) U.S. Cl. .................. 455/466; 455/456.1; 455/456.4
(58) Field of Classification Search .................. 455/457, 455/466

See application file for complete search history.

(56) References Cited

U.S. PATENT DOCUMENTS

| | | | |
|---|---|---|---|
| 7,412,325 B1* | 8/2008 | Tannenbaum et al. | 701/204 |
| 7,623,526 B2* | 11/2009 | Rangel et al. | 370/395.5 |
| 2004/0142709 A1 | 7/2004 | Coskun et al. | |
| 2005/0233759 A1 | 10/2005 | Anvekar et al. | |
| 2005/0245241 A1 | 11/2005 | Durand et al. | |
| 2006/0009243 A1 | 1/2006 | Dahan et al. | |
| 2006/0099969 A1* | 5/2006 | Staton et al. | 455/456.4 |
| 2006/0111053 A1 | 5/2006 | Wu et al. | 455/90.3 |
| 2006/0116139 A1* | 6/2006 | Appelman | 455/466 |
| 2006/0223518 A1 | 10/2006 | Haney | |
| 2007/0197231 A1* | 8/2007 | Lin | 455/456.1 |

OTHER PUBLICATIONS

*Technology White Paper, Alcatel End-to-end Location-based services solution.*

* cited by examiner

*Primary Examiner* — Nick Corsaro
*Assistant Examiner* — Gerald Johnson
(74) *Attorney, Agent, or Firm* — John L. Rogitz

(57) ABSTRACT

The GPS position or other short information related to a wireless telephone is encapsulated in a tagged protocol such as XML and sent using short message service (SMS) to peers or Internet servers, which can parse the tagged messages and extract, e.g., position information for display on a map.

7 Claims, 3 Drawing Sheets

SYSTEM

PEER

US 8,060,123 B2

SYSTEM AND METHOD FOR USING SMS AND TAGGED MESSAGE TO SEND POSITION AND TRAVEL INFORMATION TO SERVER AND/OR TO PEERS

FIELD OF THE INVENTION

The present invention relates generally to systems and methods for using short message service (SMS) encapsulating tagged messages such as XML messages to send information to Internet servers and/or peer devices.

BACKGROUND OF THE INVENTION

The present invention recognizes that short message service (SMS) including so-called concatenated SMS can be conveniently used by people to send text messages to each other using their wireless telephones. As understood herein, the SMS band can also be advantageously used as an interface between two or more functional devices.

As further understood herein, however, to facilitate automatic extraction of the information at the receiving end, it would be advantageous to encapsulate it in a tagged protocol such as extensible markup language (XML) so that a computer can automatically extract and recognize the information.

SUMMARY OF THE INVENTION

A mobile wireless communication device has a wireless telephony transceiver and a position receiver configured for outputting geographic position information. The telephone also has a processor configured for executing logic to encapsulate the geographic position information and/or other information in a message having a tagged protocol. The message is sent using short message service (SMS) to a receiver server as an interface between the mobile device and server.

The geographic position information preferably is encapsulated in the message and automatically generated such that the user does not have to key in position coordinates. To this end, the processor can present a user interface to the user from which the user can select to send the position information to a user-selected recipient. Alternatively, the user need make no selection at all, and the information is automatically encapsulated and sent, periodically or otherwise, using SMS without any user intervention at all.

In one non-limiting implementation, the protocol is extensible markup language (XML). The recipient may be a mobile wireless communication device peer of an end user, and the message may be sent directly to the peer without passing through an Internet server. Or, the recipient may be an Internet server.

In another aspect, a receiver of tagged messages transmitted from mobile wireless communication devices using SMS includes means for parsing the tagged messages to extract information therefrom, and application means for displaying the information.

In still another aspect, a method includes encapsulating, at a wireless telephone or other mobile communicating device, geographic position information in a message having a tagged format, and then sending the message using SMS.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 2:
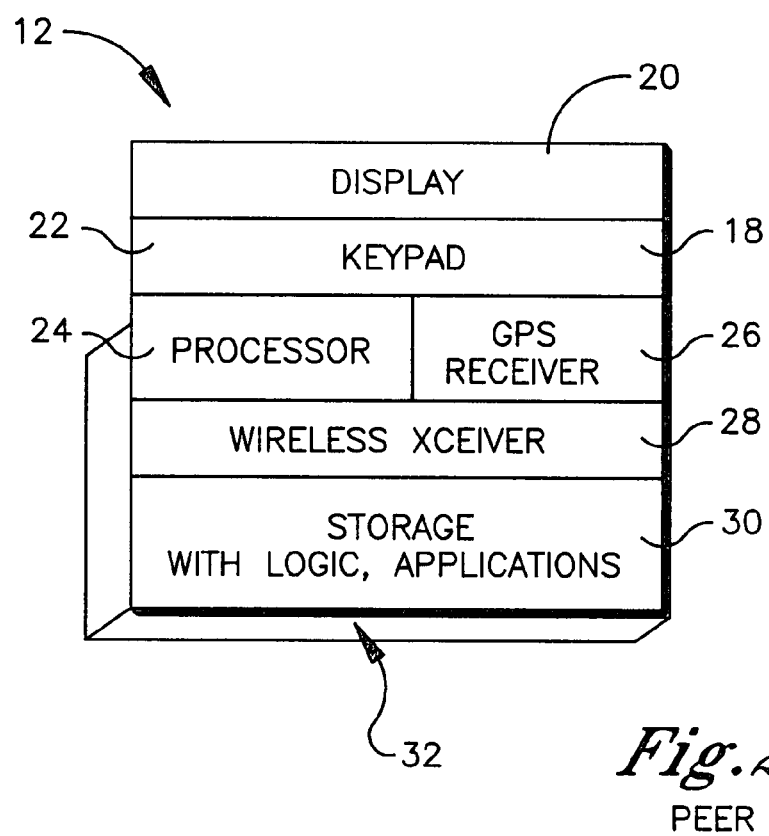
FIG. 2 is a schematic diagram of a non-limiting wireless peer device in accordance with present principles.
Figure 4:
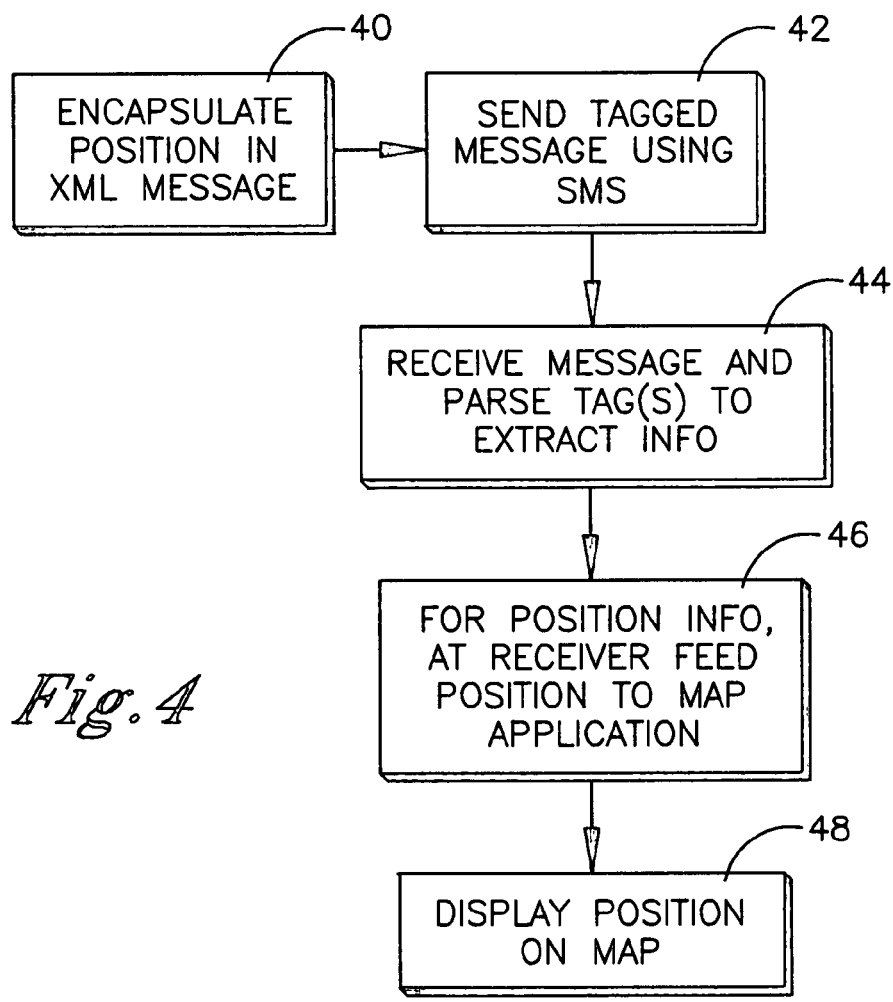
FIG. 4 is a flow chart of non-limiting logic that can be undertaken in accordance with present principles.
Figure 3:
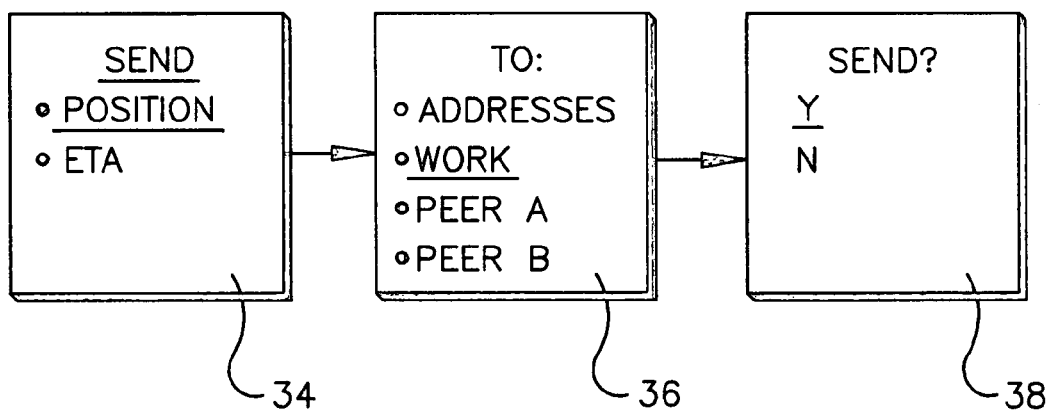
FIG. 3 is a series of non-limiting screen shots that can be displayed on a wireless peer device in undertaking the logic of FIG. 4.

The information discussed below may be sent in response to user selection as illustrated in FIGS. 3 and 4 using the wireless telephone shown in FIG. 2. Or, it may be automatically generated and sent without any user interaction at all using the simpler mobile wireless communication device shown in FIG. 5 implementing the logic of FIG. 6.

Figure 1:
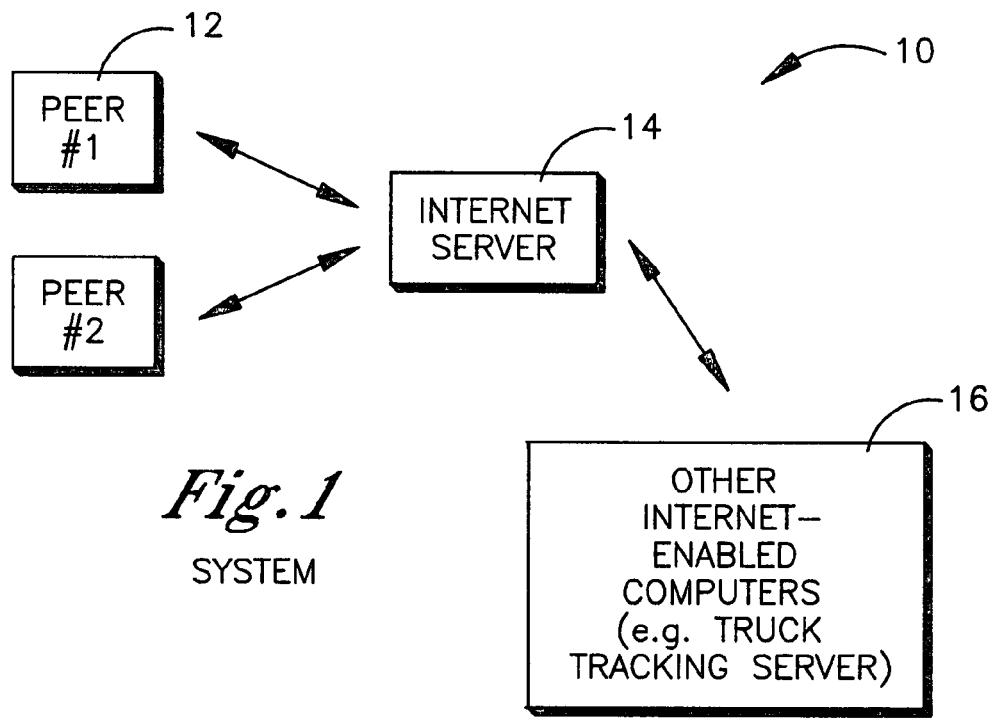
FIG. 1 is a block diagram of a non-limiting system in accordance with present principles.

Referring initially to FIG. 1, a system is shown, generally designated 10, that includes plural mobile wireless communication devices such as wireless telephone peers 12, an Internet server 14 communicating with the peers 12, and other Internet-enabled computers 16 such as truck tracking servers that communicate with the Internet server 14 and, hence, with the peers 12. The peers 12 may also communicate directly with each other without need of intervening servers.

FIG. 2 shows an example of a wireless telephone peer 12. As shown, the peer 12 includes a lightweight hand-held housing 18 that may bear a display 20 such as but not limited to a liquid crystal display (LCD). The peer 12 also advantageously may have an alpha-numeric keypad 22 with cursor navigation arrows to enable input by a person. The display 20 and keypad 22 cooperate with a processor 24 in accordance with principles known in the art, with the processor 24 controlling the display 20 and also receiving geographic position information from a receiver 26 such as but not limited to a global positioning satellite (GPS) receiver. The GPS receiver 26 receives data that identifies the current latitudinal and longitudinal coordinates of the peer 12.

Wireless communication between the peer 12 and other communication devices can be provided by a wireless transceiver 28 which transmits and receives data, such as text messages and telephone calls. The wireless transceiver 28 can be, but is not limited to, a CDMA, TDMA, or GSM transceiver.

A data storage 30 is accessible to the processor 24. The storage 30, among other things, holds applications and logic for executing the methods described below. The components above may be contained in a lightweight housing 32.

A non-limiting series of screen shots 34, 36, 38 from the display 20 is shown in FIG. 3 to illustrate an example user interface ("U/I") that can be used to invoke the logic of FIG. 4. In the first screen shot 34 of the U/I, the user is presented a list from which to choose an item of data to be sent, e.g., the position of the peer 12 and arrival time at a predetermined location, for instance, at a shipping terminal, based on a speed that can be input by the user. In the example shown in FIG. 3, the user has selected to send "position".

In response to this selection, the next screen shot 36 of the U/I might present a list of possible recipients for the position information. The list might be from the address book contained in typical wireless telephones. The user has selected "work" in the example shown to cause the screen display 38 to be presented in which the user can be prompted to send the message or not. The user has selected "yes" to send the message in the example shown.

With the above U/I methodology in mind, attention is directed to FIG. 4 for a non-limiting example of how the processor 24 executes the user's commands. Commencing at block 40, the information selected by the user to be sent (in the current example, the position of the peer 12 as received by the GPS receiver 26) is encapsulated in a tag-based protocol such as but not limited to extensible markup language (XML), it being understood that other protocols such as hypertext markup language (HTML) may also be used. An example of a tag-based protocol is shown below:

```
<?xml version="1.0"?>
  <head>
    <tag, data element>
    <tag, data element>
    <tag, data element>
  </head>
```

Moving to block 42, when the user selects "yes" to send, the message is sent using short message service (SMS), which includes so-called concatenated SMS. At block 44 the message is received by the recipient, which parses the tags to extract the information, in this example, the position of the transmitting peer. In the case of position information, the logic may move to block 46 to feed the position into an application such as a map display application, which can display the location of the transmitting peer on a computer map at block 48.

Figure 5:
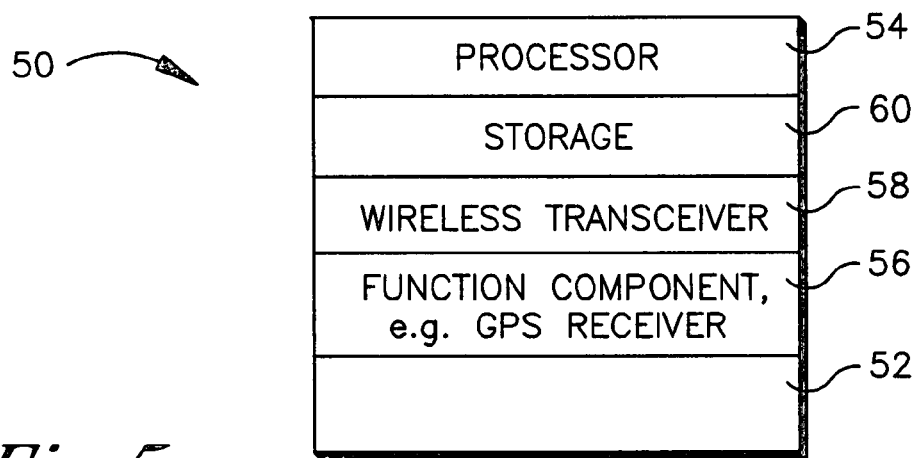
FIG. 5 is a schematic diagram of an alternate non-limiting mobile wireless communication device for automatic generation and transmission of position messages without any user action required.

As mentioned above, a mobile wireless communication device may be provided that periodically encapsulates functional information such as position information and sends it using SMS to a server without any user action whatsoever. FIG. 5 shows an example of such a device 50, which need not have a display or keypad as shown. The device 50 can include a lightweight hand-held housing 62 that may support a processor 54, with the processor 54 receiving functional information from a function component 56 which gathers the information to be provided. In one non-limiting implementation the function component 56 may be implemented by a GPS receiver.

Wireless communication between the mobile wireless communication device 50 and servers having communication capability can be provided by a wireless transceiver 58 which transmits and receives data, such as text messages. The wireless transceiver 58 can be, but is not limited to, a CDMA, TDMA, or GSM transceiver. A data storage 60 is accessible to the processor 54. The storage 60, among other things, holds applications and logic for executing the methods described below.

Figure 6:
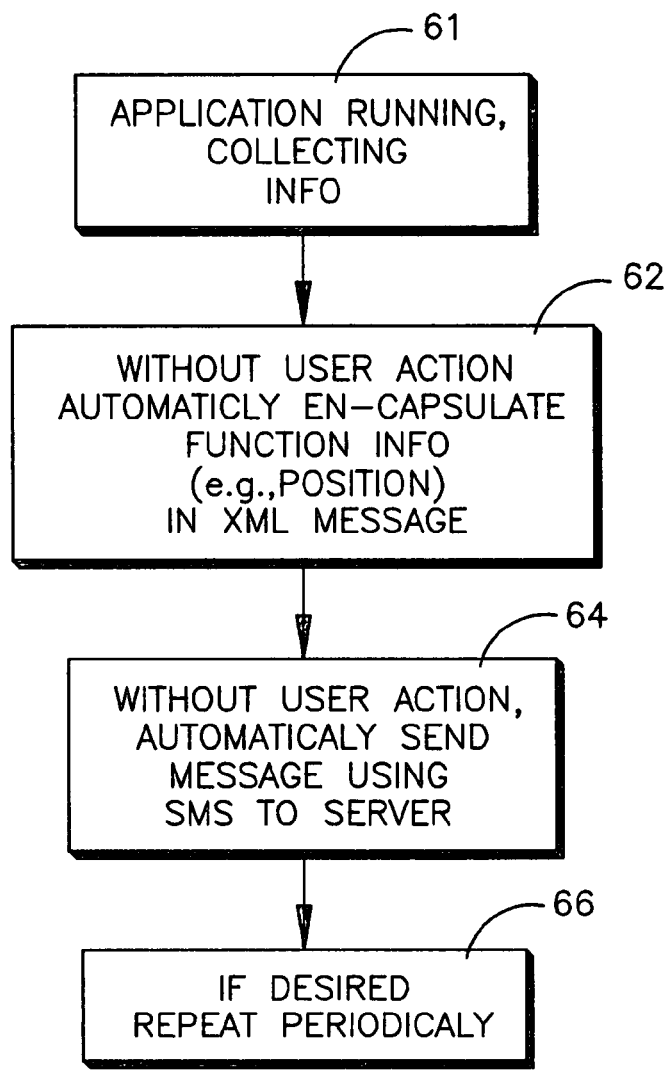
FIG. 6 is a flow chart of non-limiting logic that may be implemented by the device shown in FIG. 5.

Now referring to FIG. 6, the logic of the device 50 may be seen. Commencing at state 61, a data gathering and encapsulating application is running on the processor 54. Periodically or at some other time the logic moves to block 62 where, without any user interaction, the application automatically encapsulates the function information, e.g., geographic position, in a tagged format such as XML. Again without any user interaction, at block 64 the application automatically sends an XML message encapsulating the information in SMS to a server, the address of which can be preprogrammed into the device 50. If desired, as indicated by block 66 the process may be repeated.

While the particular SYSTEM AND METHOD FOR USING SMS AND TAGGED MESSAGE TO SEND POSITION AND TRAVEL INFORMATION TO SERVER AND/ OR TO PEERS is herein shown and described in detail, it is to be understood that the subject matter which is encompassed by the present invention is limited only by the claims.

What is claimed is:

1. A wireless telephone, comprising:
    at least one wireless telephony transceiver;
    at least one input device;
    at least one position receiver configured for outputting geographic position information; and
    at least one processor receiving user-generated signals from the input device and configured for executing logic to encapsulate the geographic position information and/ or other information in a message having a tagged protocol, the message being sent using short message service (SMS) to a receiver, wherein the processor:
    receives a user-input speed from the input device;
    presents at least a first graphical user interface (U/I) visibly listing items of data from which a user can select an item of data to be sent, an item of data to be sent as selected by the user being transmitted by the wireless telephone, at least a first item on the list being a position of the telephone and at least a second item on the list being an arrival time at a location determined by the processor based at least in part on the speed input by a user; and
    further wherein the processor presents at least a second graphical U/I visibly listing possible recipients for the item of data.

2. The telephone of claim 1, wherein the geographic position information is encapsulated in the message.

3. The telephone of claim 2, wherein the position information is encapsulated in the message automatically without user action and sent to a server.

4. The telephone of claim 2, wherein the processor presents a user interface to the user from which the user can select to send the position information to a user-selected recipient.

5. The telephone of claim 1, wherein the protocol is extensible markup language (XML).

6. The telephone of claim 1, wherein the recipient is a wireless telephone peer of an end user, and the message is sent directly to the peer without passing through an Internet server.

7. The telephone of claim 1, wherein the recipient is an Internet server.

* * * * *